United States Patent

Wagner

[15] 3,645,183
[45] Feb. 29, 1972

[54] PHOTOGRAPHIC APPARATUS

[72] Inventor: Karl Wagner, Ottobrunn, Germany

[73] Assignee: Agfa-Gevaert Aktiengesellschaft, Leverkusen, Germany

[22] Filed: Dec. 1, 1969

[21] Appl. No.: 881,057

[30] Foreign Application Priority Data

Nov. 30, 1968  Germany......................P 18 11 906.7

[52] U.S. Cl. .....................................................95/31 FM
[51] Int. Cl. ............................................................G03b 19/04
[58] Field of Search .................95/31 AC, 31 FL, 31 FM, 31

[56] References Cited

UNITED STATES PATENTS

| | | | |
|---|---|---|---|
| 1,331,852 | 2/1920 | Roikjer | 95/31 FL |
| 1,879,866 | 9/1932 | Aschenbrenner | 95/31 FM |
| 2,344,409 | 3/1944 | Kuppenbender | 95/31 FL |
| 2,629,302 | 2/1953 | Mihalyi | 95/31 AC |
| 3,148,605 | 9/1964 | Peterson | 95/31 |
| 3,232,196 | 2/1966 | Sapp | 95/31 FM |

FOREIGN PATENTS OR APPLICATIONS 1,063,776  3/1967  Great Britain......................95/31 AC

*Primary Examiner*—Samuel S. Matthews
*Assistant Examiner*—Monroe H. Hayes
*Attorney*—Michael S. Striker

[57] ABSTRACT

A still camera for use with roll film having a perforation for each film frame wherein a lever is pivotally mounted in the housing and includes a first arm which tracks the film and enters an oncoming perforation during transport of the film and a second arm which engages a gear and prevents further manipulation of the film transporting mechanism when the first arm enters a perforation. A displacing member which is turnable by the gear through the intermediary of a friction clutch disengages the first arm from the film and the second arm from the gear in response to actuation of the camera release. The film transporting mechanism is then free to advance the film whereby the gear turns the displacing member to move the first arm of the lever into engagement with the film and to cause entry of the first arm into the oncoming perforation when the transport of film by the length of a frame is completed.

10 Claims, 1 Drawing Figure

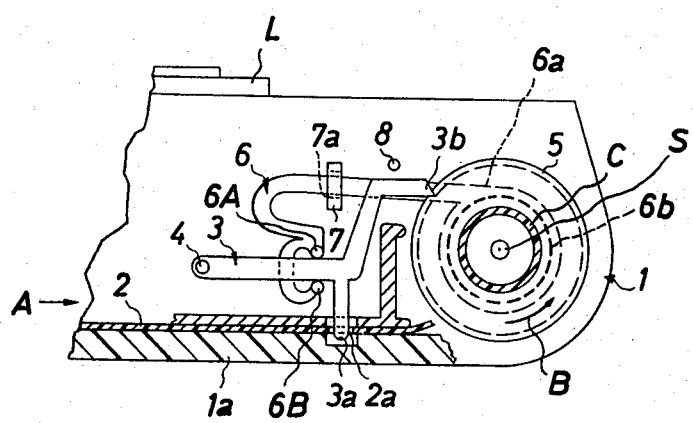
INVENTOR
KARL WAGNER 3,645,183

PHOTOGRAPHIC APPARATUS

BACKGROUND OF THE INVENTION

The present invention relates to photographic apparatus in general, especially to still cameras, and more particularly to improvements in photographic apparatus of the type intended for use with roll film having a row of perforations, one for each film frame.

It is already known to provide in the housing of a camera for use with such roll film a control member which serves to prevent further transport of film when a fresh film frame is ready for exposure. A drawback of presently known apparatus is that the means for effecting movements of the control member into and out of engagement with the film and/or with the film transporting mechanism is either too bulky, too complicated or not entirely reliable.

SUMMARY OF THE INVENTION

An object of the invention is to provide a photographic apparatus, especially a still camera, wherein the movements of the aforementioned control member are regulated and initiated in a novel and improved way.

Another object of the invention is to provide novel means for disengaging the control member from the film and from the film transporting mechanism in response to making of an exposure.

A further object of the invention is to provide a photographic apparatus wherein the control member cannot tear the film and is simpler than in presently known apparatus.

The photographic apparatus of my invention is intended for use with photographic roll film having a row of equidistant perforations, one for each film frame. The apparatus comprises a housing or body, film transporting means mounted in the housing and having a rotary device (which may include a shaft and a gear on the shaft) arranged to rotate in a predetermined direction to thereby advance the film lengthwise along a predetermined path, control means movably mounted in the housing and including a first portion adjacent to the path for roll film and arranged to enter an oncoming perforation and a second portion arranged to prevent rotation of the rotary device in response to entry of the first portion into such perforation, and displacing means mounted in the housing and arranged to urge the first portion of the control means against the advancing film in response to rotation of the rotary device so that the first portion is compelled to penetrate into an oncoming perforation when the transport of the film by the length of a frame is completed.

In accordance with a presently preferred embodiment of the invention, the displacing means comprises a portion which is coaxial with and turnable relative to the rotary device. A friction clutch is interposed between the rotary device and the portion of the displacing means to turn the latter in response to rotation of the rotary device in a direction to transport the film lengthwise whereby the displacing means causes the first portion of the control means to bear against the film.

Movement of the displacing means in a direction to effect disengagement of control means from the film and from the rotary device preferably takes place in automatic response to operation of the camera release.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a diagrammatic fragmentary horizontal sectional view of a still camera which embodies the invention.

DESCRIPTION OF THE PREFERRED EMBODIMENTS

Referring to the drawing in detail, there is shown a still camera which comprises a housing or body 1 supporting a lens mount L and accommodating a supply cartridge or cassette (not shown) containing unexposed roll film 2 having a row of equidistant perforations 2a, one for each film frame. The film 2 is transported lengthwise (arrow A) along a predetermined path adjacent to the rear wall 1a of the housing 1 by a film transporting mechanism including a shaft S which can rotate the core C of a takeup spool. A lever or a wheel, not shown, can be engaged by hand to rotate the shaft S and the core C in a counterclockwise direction as indicated by arrow B. The shaft S is connected with a toothed member here shown as a gear 5 which is coaxial with the core C. The parts S and 5 together form a rotary device which is capable of moving the film lengthwise.

The housing 1 further accommodates a control lever 3 which is pivotable on a fixed pin 4 and includes two portions or arms 3a, 3b. The shaft S is parallel with the pivot pin 4. The arm 3a tracks the film 2 and can penetrate into an oncoming perforation 2a to thereby prevent further transport of the film, i.e., it then prevents further rotation of the shaft S, core C and gear 5. The other arm 3b of the control lever 3 has a pallet which engages the adjacent tooth of the gear 5 when the arm 3a enters a perforation 2a. Thus, the arm 3b constitutes a means for positively preventing further rotation of the gear 5 and core C when the arm 3a assumes the position which is shown in the drawing.

The housing 1 further accommodates a displacing member 6 which is connected with the control member 3 and has an annular portion or ring 6a which is adjacent to and coaxial with the gear 5. A friction clutch 6b is interposed between the ring 6a and the gear 5 to permit the ring to move with the gear 5 as well as to permit the gear to move relative to the ring. The friction clutch 6b could be installed between the ring 6a and a portion of the shaft S. In the illustrated embodiment, the displacing member 6 comprises a bifurcated portion including two prongs 6A, 6B which flank a portion of the control lever 3.

A camera release 7 is reciprocable in the housing 1 at right angles to the plane of the drawing. This camera release comprises an inclined cam face 7a which pivots the displacing member 6 in a clockwise direction, as viewed in the drawing, when the operator depresses the release 7 in order to open the shutter, not shown.

The operation:

The parts of the still camera are shown in positions they assume when the camera is ready to make an exposure. Such exposure is made by depressing the camera release 7 to cause opening of the shutter. The cam face 7a of the release 7 pivots the disengaging member 6 in a clockwise direction whereby the friction clutch 6b permits the ring 6a to turn with reference to the gear 5. The prongs 6A, 6B pivot the control lever 3 in a counterclockwise direction so that the pallet of the arm 3b is disengaged from the teeth of the gear 5 and that the arm 3a is withdrawn from the adjoining perforation 2a. A stop 8 is provided to arrest the displacing member 6 in its other end position. The operator is then free to rotate the shaft S whereby the shaft rotates the core C and the gear 5 in a counterclockwise direction (arrow B) so that the film 2 moves lengthwise and is advanced by the length of a frame. The oncoming perforation 2a of the film 2 receives the arm 3a as soon as the transport of the film by the length of a frame is completed whereby the pallet of the arm 3b engages the gear 5 and prevents further anticlockwise rotation of the shaft S. The control lever 3 can be biased in a clockwise direction by a suitable spring or the like, not shown; thus, the tip of the arm 3a bears against the film 2 and automatically enters an oncoming perforation 2a to arrest the gear 5 and to return the displacing member 6 to the illustrated position.

In the illustrated embodiment, the control member 3 is not biased in a clockwise direction by a spring. Instead, the arm 3a is pressed against the travelling film 2 in response to rotation of the shaft S in a counterclockwise direction. Such rotation of the shaft S causes the gear 5 to turn the ring 6a of the displacing member 6 by way of the friction clutch 6b whereby the prong 6A urges the control lever 3 in a clockwise direction and causes the tip of the arm 3a to bear against the film. When the arm 3a bears against the film 2, the friction clutch 6b permits the shaft S to rotate the gear 5 with reference to the ring 6a until the tip of the arm 3a penetrates into the oncoming perforation 2a. The camera is ready to make the next exposure as soon as the pallet of the arm 3b engages and arrests the gear 5. Such exposure is made in response to renewed depression of the camera release 7.

It is clear that the improved camera is susceptible of many further modifications without departing from the spirit of the present invention. For example, the displacing member 6 may be made of elastically deformable metallic sheet or plastic material. Also, the displacing member 6 may be made integral with the control lever 3.

Without further analysis, the foregoing will so fully reveal the gist of the present invention that others can, by applying current knowledge, readily adapt it for various applications without omitting features which fairly constitute essential characteristics of the generic and specific aspects of my contribution to the art, and therefore, such adaptations should and are intended to be comprehended within the meaning and range of equivalence of the claims. What is claimed as new and desired to be protected by Letters Patent is set forth in the appended claims:

I claim:

1. In an photograph apparatus for use with roll film having a row of perforations, one for each film frame, a combination comprising a housing; film transporting means mounted in said housing and having a rotary device arranged to rotate in a predetermined direction and to thereby advance the film lengthwise along a predetermined path; control means movably mounted in said housing and including a first portion adjacent to said path and arranged to enter an oncoming perforation and a second portion arranged to prevent rotation of said rotary device in response to entry of said first portion into such perforation; displacing means mounted in said housing and arranged to urge said first portion of said control means against the advancing film in response to rotation of said rotary device; and friction generating means operative to move said displacing means in response to rotation of said rotary device.

2. A combination as defined in claim 1, wherein said rotary device includes a toothed member and said second portion of said control means is arranged to engage said toothed member in response to entry of said first portion of said control means into an oncoming perforation.

3. A combination as defined in claim 1, wherein said displacing means is integral with said control means.

4. A combination as defined in claim 1, wherein said displacing means includes a bifurcated portion which straddles a third portion of said control means.

5. A combination as defined in claim 1, wherein said control means is pivotable in said housing about a fixed axis and wherein said displacing means is turnable about the axis of said rotary device.

6. A combination as defined in claim 5, wherein said fixed axis is parallel to the axis of said rotary device.

7. In a photographic apparatus for use with roll film having a row of perforations, one for each film frame, a combination comprising a housing; film transporting means mounted in said housing and having a rotary device arranged to rotate in a predetermined direction and to thereby advance the film lengthwise along a predetermined path; control means movably mounted in said housing and including a first portion adjacent to said path and arranged to enter an oncoming perforation and a second portion arranged to prevent rotation of said rotary device in response to entry of said first portion into such perforation; displacing means mounted in said housing and arranged to urge said first portion of said control means against the advancing film in response to rotation of said rotary device, said displacing means comprising a portion which is coaxial with and is turnable with reference to said rotary device; and friction clutch means interposed between said rotary device and said portion of said displacing means.

8. A combination as defined in claim 7, wherein said displacing means comprises a second portion in motion transmitting engagement with said control means.

9. A combination as defined in claim 7, wherein at least a portion of said displacing means consists of elastomeric material.

10. A combination as defined in claim 7, further comprising release means operable to move said displacing means in a direction to respectively disengage said first and second portions of said control means from a perforation and from said rotary device whereby said friction clutch means permits angular displacement of said portion of said displacing means with reference to said rotary device.

* * * * *